(12) United States Patent
Ito et al.

(10) Patent No.: US 8,994,516 B2
(45) Date of Patent: Mar. 31, 2015

(54) CONTROL DEVICE, CONTROL METHOD, AND PROGRAM

(75) Inventors: Shin Ito, Tokyo (JP); Yoshinori Ohashi, Tokyo (JP); Eiju Yamada, Kanagawa (JP); Tsuyoshi Honma, Tokyo (JP)

(73) Assignee: Sony Corporation (JP)

( * ) Notice: Subject to any disclaimer, the term of this patent is extended or adjusted under 35 U.S.C. 154(b) by 274 days.

(21) Appl. No.: 13/357,875

(22) Filed: Jan. 25, 2012

(65) Prior Publication Data

US 2012/0200783 A1 Aug. 9, 2012

(30) Foreign Application Priority Data

Feb. 3, 2011 (JP) ................................ P2011-022069

(51) Int. Cl.
*H04N 5/44* (2011.01)
*H04M 1/725* (2006.01)
*G06F 1/16* (2006.01)
*G06F 3/01* (2006.01)
*G06F 3/03* (2006.01)
*G06F 3/0346* (2013.01)
(Continued)

(52) U.S. Cl.
CPC ......... *H04M 1/72533* (2013.01); *G06F 1/1626* (2013.01); *G06F 1/1694* (2013.01); *G06F 3/017* (2013.01); *G06F 3/0304* (2013.01); *G06F 3/0346* (2013.01); *H04N 5/4403* (2013.01); *H04N 21/4126* (2013.01); *H04N 21/42222* (2013.01); *G06F 2200/1637* (2013.01); *H04M 2250/12* (2013.01); *H04N 2005/4428* (2013.01)
USPC . 340/12.22; 340/1.1; 340/539.1; 340/870.02; 340/573.1; 340/635; 340/517; 345/156; 345/158; 345/179; 345/172; 702/117; 455/575.1; 455/404.2; 455/556.1

(58) Field of Classification Search
CPC ............... G08C 13/00; G08C 2200/00; G08C 2201/00; G08C 2201/32; H04N 2005/4432; H04N 21/4126; H04N 21/422
USPC ............... 340/12.22, 1.1, 539.1, 870.02, 635, 340/517; 345/156, 158, 179, 172; 702/117; 455/575.1, 404.2, 556.1
See application file for complete search history.

(56) References Cited

U.S. PATENT DOCUMENTS

| 2005/0212754 | A1* | 9/2005 | Marvit et al. | 345/156 |
| 2007/0156364 | A1* | 7/2007 | Rothkopf | 702/117 |

(Continued)

FOREIGN PATENT DOCUMENTS

| JP | 2006-295554 | 10/2006 |
| JP | 2007060406 A | 3/2007 |

(Continued)

OTHER PUBLICATIONS

European Search Report EP 12152409, dated Jun. 6, 2012.

(Continued)

*Primary Examiner* — Benjamin C Lee
*Assistant Examiner* — Chico A Foxx
(74) *Attorney, Agent, or Firm* — Lerner, David, Littenberg, Krumholz & Mentlik, LLP

(57) ABSTRACT

A control device may include a control unit to control transmission of a predetermined control command to a controlled device, when an operation surface is put face down is detected from a detection result of at least one sensor indicating the operation surface is put face down.

15 Claims, 11 Drawing Sheets

(51) Int. Cl.
*H04N 21/41* (2011.01)
*H04N 21/422* (2011.01)

(56) References Cited

U.S. PATENT DOCUMENTS

| | | |
|---|---|---|
| 2008/0284724 A1 | 11/2008 | Alten |
| 2010/0149432 A1 | 6/2010 | Roberts et al. |
| 2010/0159998 A1* | 6/2010 | Luke et al. ............. 455/567 |
| 2010/0164745 A1* | 7/2010 | Migos et al. ........ 340/825.69 |
| 2011/0050569 A1* | 3/2011 | Marvit et al. ............ 345/158 |
| 2011/0058107 A1* | 3/2011 | Sun et al. ................. 348/734 |
| 2011/0205156 A1* | 8/2011 | Gomez et al. ............ 345/157 |

FOREIGN PATENT DOCUMENTS

| | | |
|---|---|---|
| JP | 2007-531113 | 11/2007 |
| JP | 2009100366 A | 5/2009 |
| WO | 2007036818 A1 | 4/2007 |

OTHER PUBLICATIONS

Japanese Office Action for Application No. 2011-022069 dated Jul. 29, 2014.

* cited by examiner

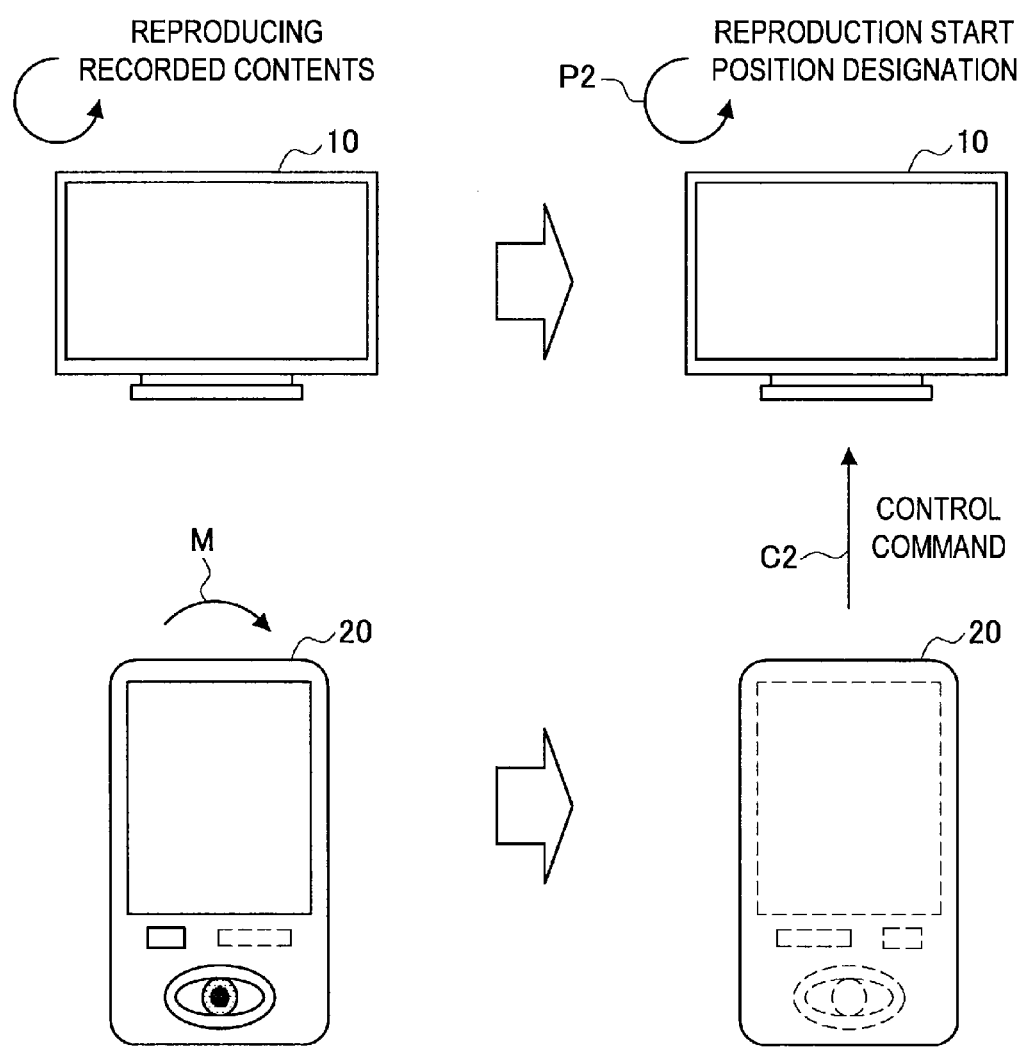

CONTROL DEVICE, CONTROL METHOD, AND PROGRAM

CROSS-REFERENCE TO RELATED APPLICATIONS

This application claims priority from Japanese Patent Application No. 2011-022069 filed in the Japan Patent Office on Feb. 3, 2011, the entire content of which is hereby incorporated by reference.

BACKGROUND

The present disclosure relates to a control device, a control method, and a program.

There is a known control system that includes: a controlled device such as a television and a recorder; and a control device such as a commander which controls the controlled device.

When an operational input is received from a user, the control device transmits a control command to the controlled device according to the operational input. In general, the operational input is carried out by operating hardware buttons or software buttons. However, an operational input may be performed in such a manner that the control device enters a state where the operation surface is put face down and is placed still on a stationary plane such as a desk, and this state is maintained for a predetermined time. Here, the execution of the operation, in which the control device enters a state where the operation surface is put face down and is placed still, is determined in such a manner that an acceleration sensor in the control device is used to detect the rotation or the direction of the control device.

SUMMARY

However, according to the related art using only an acceleration sensor, for example, even when a user holds the control device with his or her hand and turns the control device downward with the operation surface uncovered, the control device may determine that such an operational input is executed so that a control command may be erroneously transmitted.

In light of the foregoing, it is desirable to provide a control device, a control method, and a program which can appropriately determine the execution of the operation in which the control device enters a state where the operation surface is put face down and is placed still on a stationary plane.

In accordance with one embodiment, a control device may include a control unit to control transmission of a predetermined control command to a controlled device, when an operation surface is put face down is detected from a detection result of at least one sensor indicating the operation surface is put face down.

In accordance with another embodiment, a control method may include controlling, by a processor, transmission of a predetermined control command to a controlled device, when an operation surface is put face down is detected from a detection result of at least one sensor indicating the operation surface is put face down.

In accordance with another embodiment, a non-transitory recording medium may be recorded with a computer readable program executable by a computer, where the program may include controlling transmission of a predetermined control command to a controlled device, when an operation surface is put face down is detected from a detection result of at least one sensor indicating the operation surface is put face down.

As described above, according to the present disclosure, it is possible to provide a control device, a control method, and a program which can appropriately determine the execution of the operation in which the control device enters a state where the operation surface is put face down and does not move on a stationary plane.

BRIEF DESCRIPTION OF THE DRAWINGS

FIG. 8B is a diagram illustrating an operation example of a control system (2/4);

DETAILED DESCRIPTION OF THE EMBODIMENT

Figure 1:
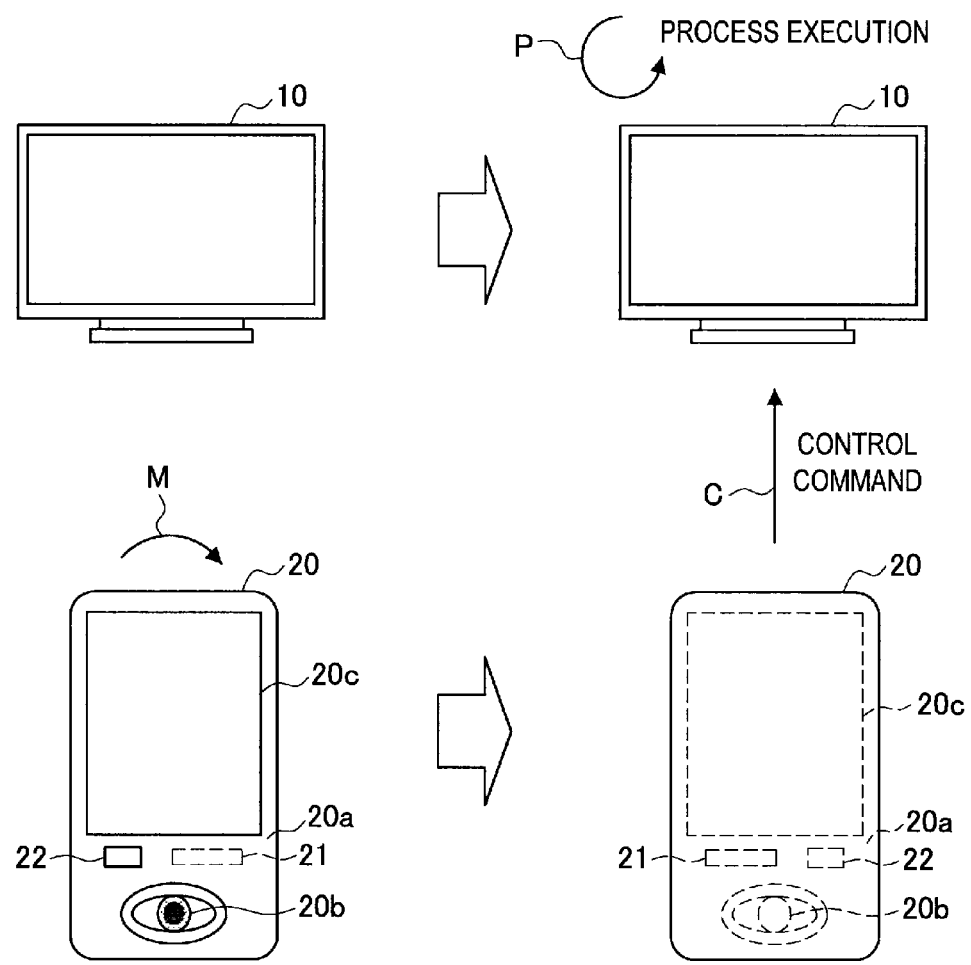
FIG. 1 is a diagram illustrating an overview of a control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. Overview of Control System

First, an overview of a control system according to an embodiment of the present disclosure will be described with reference to FIG. 1. FIG. 1 is a diagram illustrating the overview of the control system according to the embodiment of the present disclosure.

As illustrated in FIG. 1, the control system includes a controlled device (television 10) and a control device (commander 20) that serves to control the controlled device. The controlled device is communicably connected to the control device in a wired or wireless manner, or in some cases, through a network. As the controlled device, a device such as the television 10, a recorder, or a personal computer that is capable of reproducing contents can be exemplified. As the control device, a mobile device such as the commander 20, a portable phone, or a personal digital assistant (PDA) can be exemplified. In the following description, a case will be presented where the controlled device is the television 10 equipped with a recorder therein, and the control device is the commander 20 operated by a user.

The television 10 reproduces contents and outputs video signals and/or audio signals corresponding to the contents.

When an operational input is received from a user, the commander 20 transmits a control command C to the television 10 according to the operational input. The operational input is carried out by operating hardware buttons or software buttons. The operational input can be carried out also by a first operation M in which the commander 20 enters a state where an operation surface 20a thereof is put face down and is placed still on a stationary plane S such as a desk and this state is maintained for a predetermined time.

The commander 20 includes a first sensor 21 and a second sensor 22. The first sensor 21 is a sensor that detects the acceleration of the commander 20. The second sensor 22 is a sensor that detects the light with which the operation surface 20a is irradiated.

The commander 20 detects the operation in which the commander 20 enters a state where the operation surface 20a thereof is put face down and is placed still, on the basis of the detection result of the first sensor 21. The commander 20 detects the operation in which the commander 20 enters a state where the amount of light with which the operation surface 20a is irradiated is smaller than a first threshold value, on the basis of the detection result of the second sensor 22. The first threshold value is set to determine the state where the operation surface 20a is put face down (a state where the operation surface 20a is turned downward so that it is not operable).

When it is determined that the first operation M is performed in which the commander 20 enters a state where the operation surface 20a is put face down and is placed still and the amount of the light with which the operation surface 20a is irradiated is smaller than the first threshold value and this state is maintained for a predetermined time, the commander 20 transmits a predetermined control command C to the television 10. On the other hand, the television 10 performs a process assigned to the control command C in response to the control command C (P).

In this way, when the commander 20 enters a state where the operation surface 20a is put face down and is placed still and the amount of light with which the operation surface 20a is irradiated is smaller than the first threshold value, it is determined that the first operation M is executed. Therefore, since the execution of the first operation M is not determined in a state where the operation surface 20a is not put face down, it is possible to appropriately determine the execution of the operation in which the commander 20 enters the state where the operation surface 20a is put face down and is placed still with respect to the stationary surface S.

2. Configuration of Control System

Figure 2:
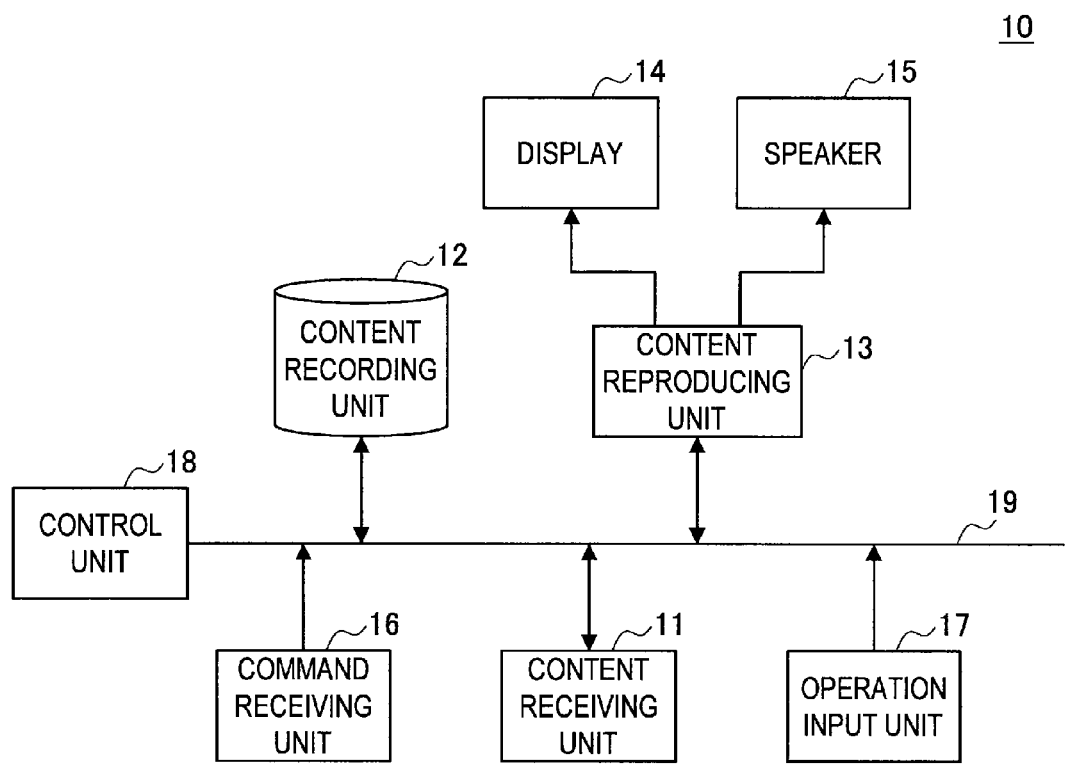
FIG. 2 is a block diagram illustrating a functional configuration of a television according to the embodiment of the present disclosure.
Figure 3:
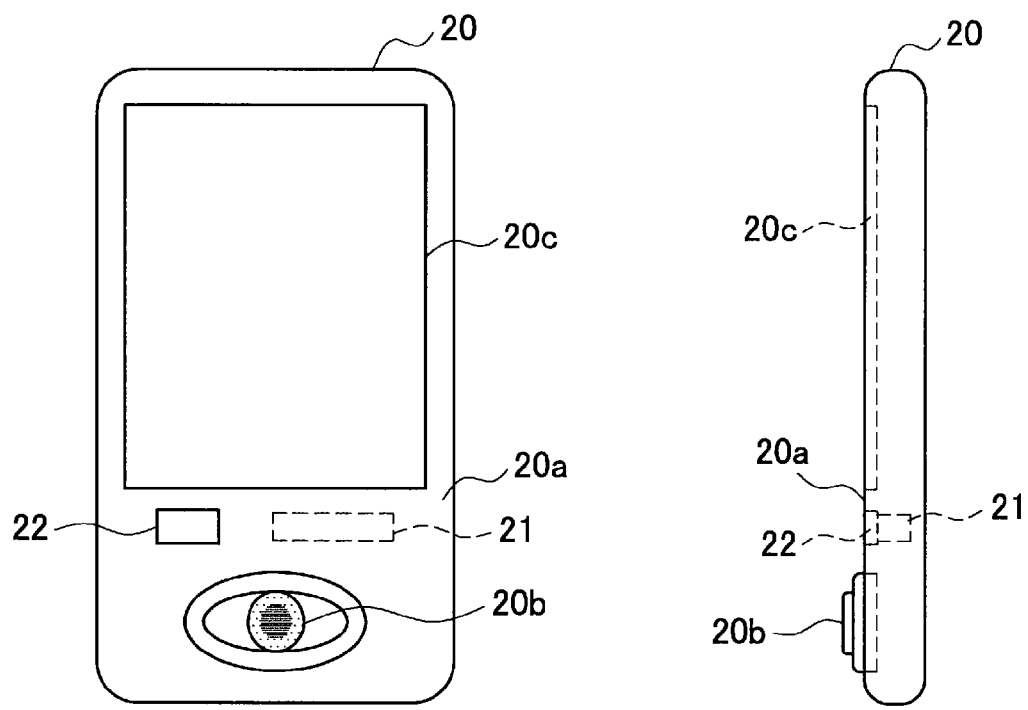
FIG. 3 is a diagram illustrating the appearance of a commander.
Figure 4:
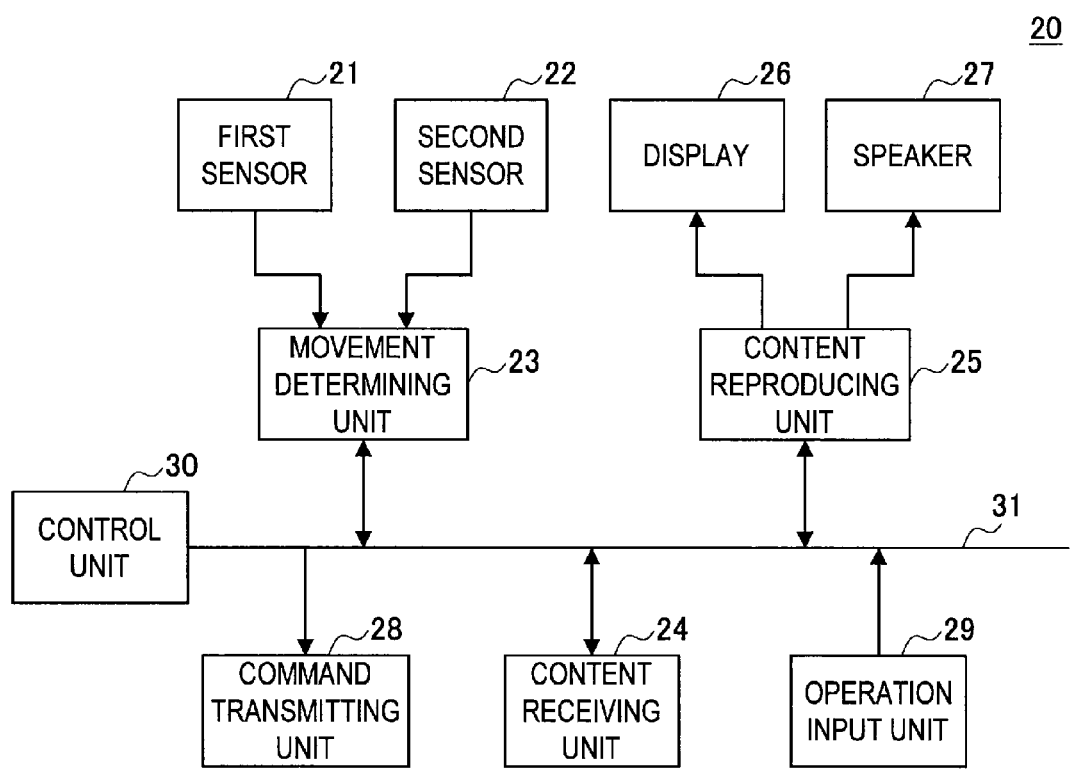
FIG. 4 is a block diagram illustrating the functional configuration of a commander.
Figure 5:
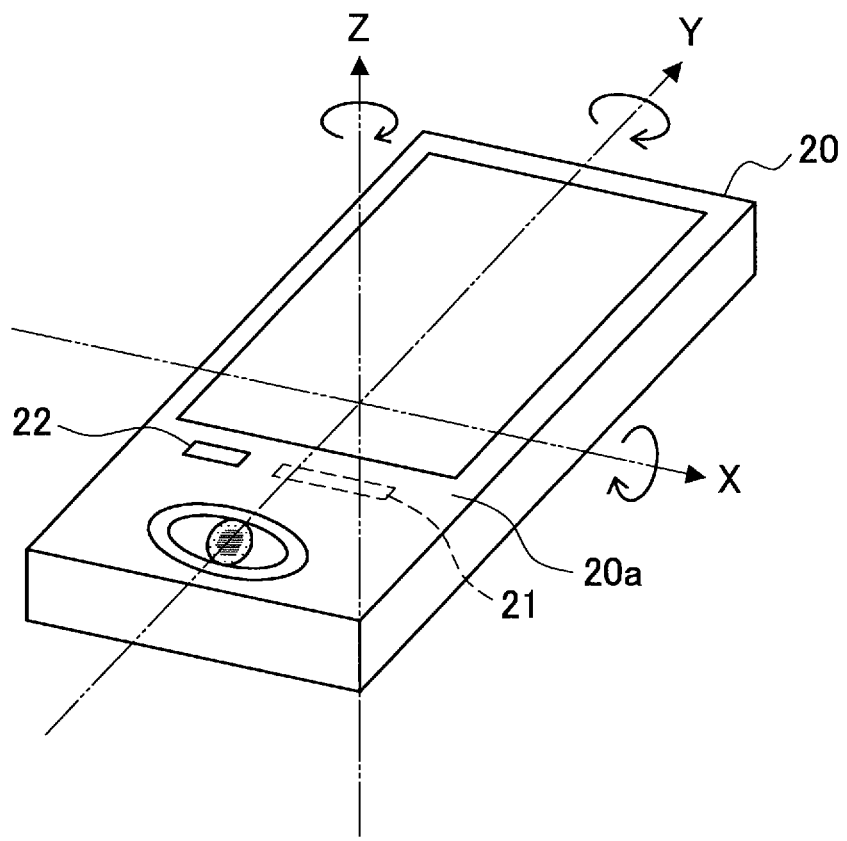
FIG. 5 is a diagram illustrating a detection coordinate system of a first sensor.

Next, the configuration of a control system according to the embodiment of the present disclosure will be described with reference to FIGS. 2 to 5. FIG. 2 is a block diagram illustrating the functional configuration of the television 10 according to the embodiment of the present disclosure. FIG. 3 is a diagram illustrating the appearance of the commander 20 and FIG. 4 is a block diagram illustrating the functional configuration of the commander 20. FIG. 5 is a diagram illustrating a detection coordinate system of the first sensor 21.

As illustrated in FIG. 2, the television 10 includes a content receiving unit 11, a content recording unit 12, a content reproducing unit 13, a display 14, a speaker 15, a command receiving unit 16, an operation input unit 17, and a control unit 18. The content receiving unit 11, the content recording unit 12, the content reproducing unit 13, the command receiving unit 16, and the operation input unit 17 are all connected to the control unit 18 through a bus 19.

The content receiving unit 11 receives contents (data) through an antenna or a network (not shown), and supplies the received contents to the content recording unit 12 or the content reproducing unit 13. The content recording unit 12 records the contents (the received contents) supplied from the content receiving unit 11, and reads the contents (the recorded contents) that have been recorded to supply the contents to the content reproducing unit 13.

The content reproducing unit 13 reproduces the contents supplied from the content receiving unit 11 or the contents read from the content recording unit 12 and supplies video data and audio data to the display 14 and the speaker 15, respectively. The display 14 outputs a video corresponding to the video data supplied from the content reproducing unit 13. The speaker 15 outputs an audio sound corresponding to the audio data supplied from the content reproducing unit 13.

The command receiving unit 16 receives the control command C transmitted from a remote controller (not shown) which is dedicated to the commander 20 or the television 10. For example, examples of the control command C may include: commands for reproduction start, switching, and completion of the received contents; commands for reproduction start, pause, stop, fast-forwarding, rewinding, and completion of the recorded contents; commands for recording start, stop, and completion of the received contents; and the command for the volume control of the contents.

The operation input unit 17 receives an operation command input by a user through buttons in the main body of the television 10. For example, examples of the operation command may include: commands for reproduction start, switching, and completion of the received contents; commands for reproduction start, pause, stop, fast-forwarding, rewinding, and completion of the recorded contents; commands for recording start, stop, and completion of the received contents; and the command for the volume control of the contents.

The control unit 18 includes a CPU, a ROM, a RAM, and the like. The CPU reads a program from the ROM or the like and develops a program in the RAM to execute the program. In this way, the CPU performs a calculation or control to operate the television 10. The control unit 18 controls the respective units of the television 10 in accordance with the control command C or operation command.

FIG. 3 is the front view and the right side view illustrating the commander 20. As illustrated in FIG. 3, the commander 20 includes the operation surface 20a that is provided on the front surface of a plate-like housing. The operation surface 20a is a flat surface in which an operation area (an operation element, an operation screen, and the like) is provided to operate the commander 20. In a lower portion of the operation surface 20a, a jog dial 20b is provided as an example of the operation element. In a center portion of the operation surface 20a, a touch panel 20c is provided. Further, the operation surface 20a may not include both of the jog dial 20b and the touch panel 20c but include only the touch panel 20c, or alternatively it may include a display such as a liquid crystal display and operation elements such as hardware buttons provided thereon.

The commander 20 includes: the first sensor 21 having an acceleration sensor built in the housing; and the second sensor 22 having an optical sensor and the like provided in the operation surface 20a. As illustrated in FIG. 3, the second sensor 22 is located in the substantial center portion of the operation surface 20a. However, the second sensor 22 may be located at another position so that light may not have an influence on the touch panel 20c. The second sensor 22 may be provided at plural positions, for example, at four corners of the operation surface 20a.

As illustrated in FIG. 4, the commander 20 includes the first and second sensors 21 and 22, a movement determining unit 23, a content receiving unit 24, a content reproducing unit 25, a display 26, a speaker 27, a command transmitting unit 28, an operation input unit 29, and a control unit 30. The movement determining unit 23, the content receiving unit 24, the content reproducing unit 25, the command transmitting unit 28, and the operation input unit 29 are all connected to the control unit 30 through a bus 31.

The first sensor 21 detects the acceleration acting on the commander 20, and supplies the detection result to the movement determining unit 23. As illustrated in FIG. 5, the first sensor 21 detects the acceleration using a detection coordinate system having X, Y, and Z axes. In the detection coordinate system, the X axis and the Y axis are perpendicular to each other and extend in parallel to the operation surface 20a; and the Z axis is perpendicular to the X and Y axes and extends in a direction vertical to the operation surface 20a. The first sensor 21 detects the acceleration occurring in the directions of the X, Y, and Z axes, and the acceleration caused by rotation around the respective axes. The first sensor 21 detects the acceleration of −1 G (Gravity) in the Z axis in a state where the operation surface 20a is turned downward in the vertical direction and does not move.

The second sensor 22 has a sensor surface which is provided on the operation surface 20a to detect the light with which the operation surface 20a (the sensor surface) is irradiated, and supplies the detection result to the movement determining unit 23. The second sensor 22 detects the amount of light very close to "0" in a state where the operation surface 20a is completely put face down with respect to a non-light-transmitting, flat surface (the state where the operation surface 20a is in contact with or is about to come into contact with the flat surface while being in parallel to the flat surface).

The movement determining unit 23 determines that the first operation M is performed in which the commander 20 enters the above-mentioned state and remains in that state for a predetermined time almost simultaneously with the detection on the basis of the detection result of the first and second sensors 21 and 22. On the basis of the detection results of the first sensor 21, the movement determining unit 23 detects the operation in which the commander 20 enters the state where the operation surface 20a is put face down and is placed still. This means that the predetermined acceleration (which is caused by the rotation of the commander 20) around the X axis and/or the Y axis is detected, and subsequently thereto, the acceleration (which is caused by putting the operation surface 20a face down) of about −1 G in the Z axis and the change in acceleration (which is smaller than the predetermined threshold value because the commander 20 does not move) in the direction of each axis and around each axis are detected almost simultaneously. In addition, the commander 20 may not be put face down on a horizontal surface, and may alternatively be put face down on a slightly sloped surface.

On the basis of the detection result of the second sensor 22, it is detected that the commander 20 enters the state where the amount of the light with which the operation surface 20a is irradiated is smaller than the first threshold value. Furthermore, using a timer (not shown) provided in the movement determining unit 23, the control unit 30, or the like, it is determined that an operation is performed in which the commander 20 maintains its state for a predetermined time after entering the state.

The content receiving unit 24 receives the contents (data) through an antenna or a network (not shown), and supplies the received contents to the content reproducing unit 25. The content reproducing unit 25 reproduces the contents supplied from the content receiving unit 24, and supplies video data and audio data to the display 26 and the speaker 27, respectively. The display 26 and the speaker 27 have the same functions as those of the display 14 and the speaker 15 of the television 10, respectively.

The command transmitting unit 28 transmits the control command C to the television 10 as described in connection with the command receiving unit 16. As to be described later, examples of the control command C also includes commands for: start of temporary recoding (cache recording) which temporarily records the received contents; designation of a reproduction start position of the recorded contents; reproduction stop (pause) of the contents; and sound mute of the contents.

The operation input unit 29 receives an operation command which is input by a user through the jog dial 20b or the software (GUI) buttons displayed on the touch panel 20c. In a case where the commander 20 includes the touch panel 20c, a part of the operation input unit 29 is integrally provided with the display 26 in order to receive the operational input through the touch panel 20c. In this case, for example, examples of the operation command include commands for reproduction start, switching, and completion of the received contents and the command for the volume control of the contents. There may be a case where the control command C for controlling the television 10 is generated by the operation command.

The control unit 30 includes a CPU, a ROM, a RAM, and the like. The CPU reads a program from the ROM or the like and develops the program on the RAM to execute the program. In this way, the CPU performs a calculation or control to operate the commander 20. The control unit 30 controls the respective units of the commander 20 in accordance with the operation command, or generates the control command C for controlling the television 10.

3. Operation of the Control System

Figure 6:
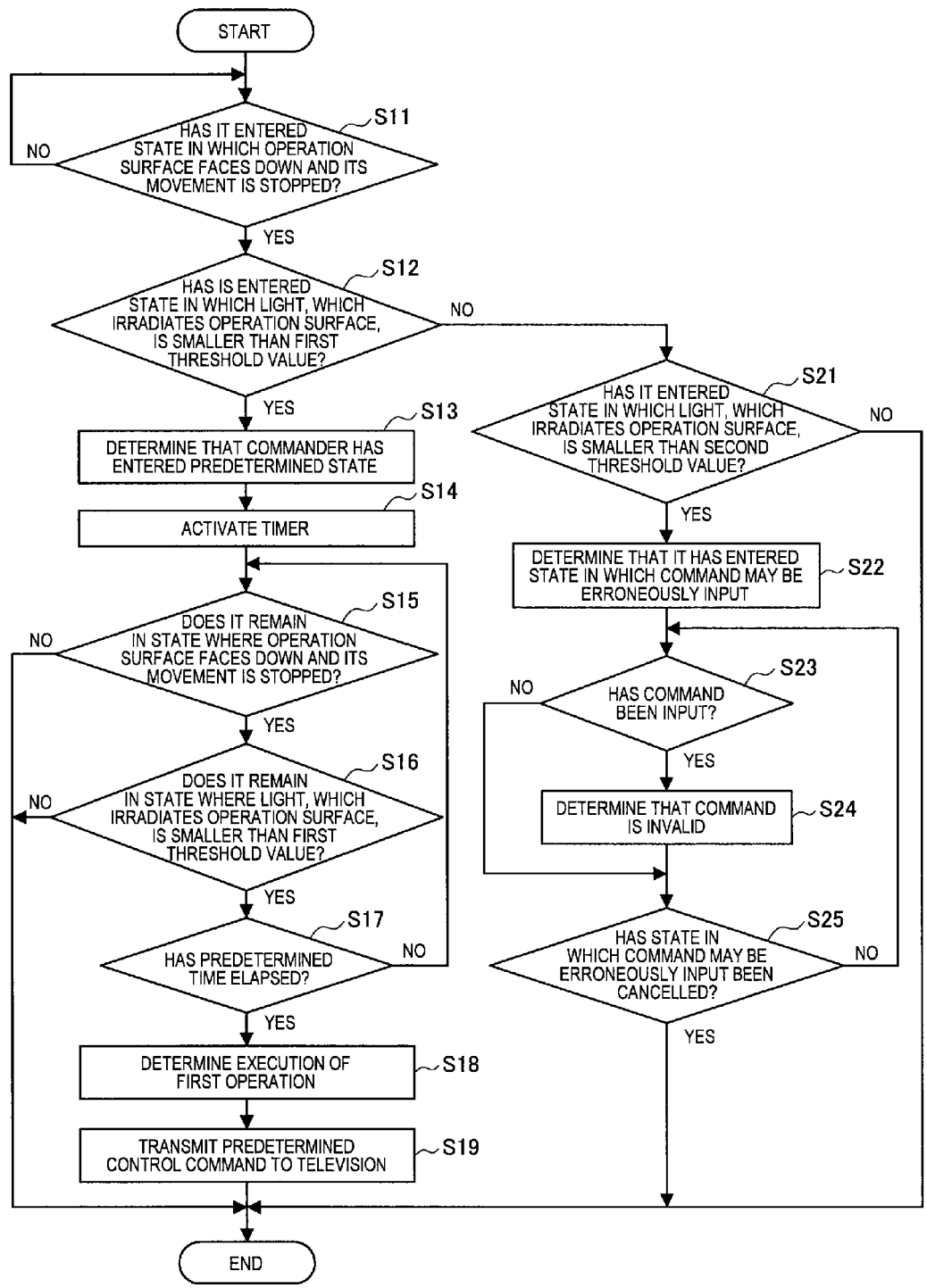
FIG. 6 is a flowchart illustrating the operation of a commander.
Figure 7:
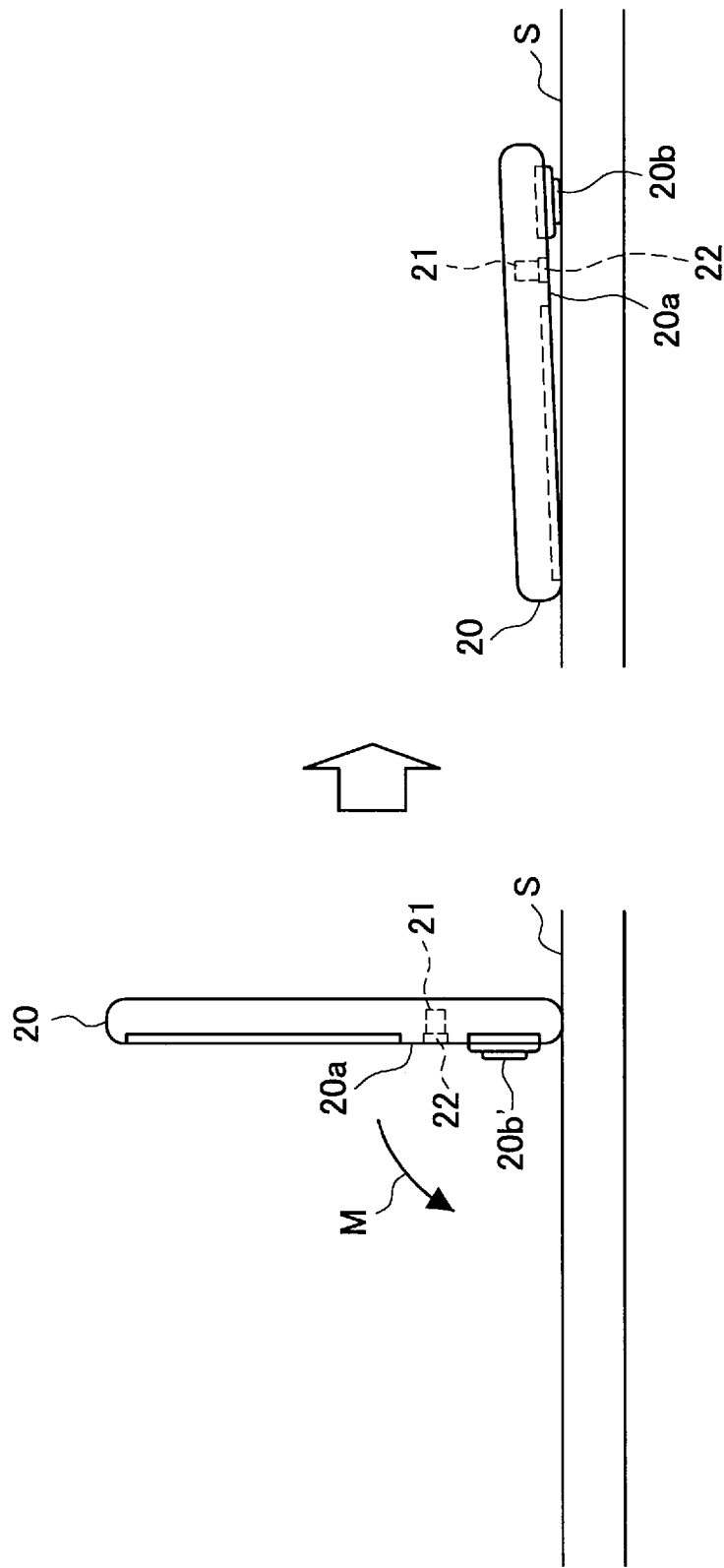
FIG. 7 is a diagram illustrating an example of a state in which a command is erroneously input.

Next, the operation of the control system according to the embodiment of the present disclosure will be described with reference to FIG. 6 to FIGS. 8A to 8D. FIG. 6 is a flowchart illustrating the operation of the commander 20 and FIG. 7 is a diagram illustrating an example of a state where a command is erroneously input. FIGS. 8A to 8D are diagrams illustrating operational examples of the control system.

In the commander 20, the first and second sensors 21 and 22 continuously supply the detection results to the movement determining unit 23. As illustrated in FIG. 6, the movement determining unit 23 determines whether or not the commander 20 enters the state where the operation surface 20a is put face down and is placed still on the basis of the detection results of the first sensor 21 (Step S11). The movement determining unit 23 returns to the process of Step S11 in a case where the determination condition is not satisfied.

In a case where the determination condition is satisfied, the movement determining unit 23 determines whether or not the commander 20 enters the state where the amount of the light with which the operation surface 20a is irradiated is smaller than the first threshold value, on the basis of the detection results of the second sensor 22 (Step S12). The first threshold value corresponds to a detection value which is obtained in a state where the operation surface 20a is completely put face down with respect to a non-light-transmitting flat surface or a value which is obtained by adding some margin to the detection value. In a case where the determination condition for an affirmative result is not satisfied, the movement determining unit 23 proceeds to the process to Step S21 which will be described later.

First, the case where the determination condition for an affirmative result is satisfied in Step S12 will be described. In this case, the movement determining unit 23 determines that the commander enters the state (predetermined state) where the operation surface 20a is put face down and is placed still and the amount of the light with which the operation surface 20a is irradiated is smaller than the first threshold value (Step S13), and activates the timer (Step S14).

When the timer is activated, the movement determining unit 23 continuously performs the determination with the detection results of the first and second sensors 21 and 22 until the predetermined time elapses (Steps S15 and S16). The predetermined time is set to a period of, for example, several seconds to several tens of seconds by which user's intention of controlling the television 10 can be confirmed.

In a case where a predetermined time elapses in the predetermined state ("Yes" in Step S17) being maintained, the movement determining unit 23 determines that the first operation M is executed by a user to control the television 10 (Step S18), and then informs the control unit 30 of the determination result. On the other hand, the movement determining unit 23 ends the process in the case where the predetermined state is not maintained for the predetermined time, that is, in a case where the determination conditions for an affirmative result in Step S15 and/or Step S16 are not satisfied.

When it is determined that the first operation M is executed in Step S18, the control unit 30 instructs the command transmitting unit 28 to transmit the control command C which is assigned to the first operation M (Step S19). The television 10 receives the control command C and executes a process in accordance with the control command C.

In a case where it is determined that the first operation M is executed, the determinations (Steps S11 and S15) based on the detection result of the first sensor 21 and the determinations (Steps S12 and S16) based on the detection result of the second sensor 22 are performed in series.

In a case where the determination condition for an affirmative result in Step S12 is not satisfied, the movement determining unit 23 determines whether or not the commander 20 enters the state where the amount of the light with which the operation surface 20a is irradiated is smaller than a second threshold value on the basis of the detection result of the second sensor 22 (Step S21). The second threshold value corresponds to a detection value equal to or larger than the first threshold value, that is, a detection value which is obtained in a state where the operation surface 20a is irradiated with a trace amount of light. The movement determining unit 23 ends the process in a case where the determination condition for an affirmative result is not satisfied.

Now, the state illustrated in FIG. 7 will be assumed. That is, in the commander 20, since an operation element 20b' such as a jog dial which protrudes from the operation surface 20a comes into contact with a stationary surface S, the operation surface 20a is not completely put face down. As a result, the operation surface 20a is irradiated with the ambient light of the commander 20, and accordingly the second sensor 22 detects a trace amount of light corresponding to a detection value equal to or larger than the first threshold value. In this state, an erroneous operational input may be carried out due to the operation element being in contact with the stationary surface S, and a process (relating to the commander 20 itself or relating to a process of controlling the television 10) may be performed according to the erroneous operational input.

In a case where the determination condition for an affirmative result in Step S21 is satisfied, the movement determining unit 23 determines that it enters a state where the operation command may be input erroneously (Step S22), and informs the control unit 30 of a report on that fact. The notification is transmitted as flag information indicating the likeliness of an erroneous input. The flag information is valid during the second operation in which the operation surface 20a is put face down and is placed still and the amount of the light with which the operation surface 20a is irradiated is equal to or larger than the first threshold value but smaller than the second threshold value and during a period in which this state is kept.

The control unit 30 determines whether or not a command is input through the operation input unit 29 (Step S23). In a case where there is likeliness of an erroneous input, the control unit 30 determines that the command is invalid, so that a process according to the command is not executed (Step S24). In a case where there is no likeliness of an erroneous input, the control unit 30 performs a process according to the command as usual. The commander 20 repeatedly performs the process of Step S23 and the processes of the subsequent Steps until the probability of an erroneous input of the operation command becomes zero, that is, until the state following the second operation is canceled ("Yes" in Step S25). Therefore, even in the state illustrated in FIG. 7, the commander 20 does not perform a process according to an erroneous operational input.

FIGS. 8A to 8D illustrate an example of a method of controlling the television 10 through the execution of the first operation M in which the commander 20 enters a predetermined state and the state is kept for a predetermined time. Further, only one control command C may be assigned to the first operation M, or alternatively a plurality of control commands C selected according to the states of the television 10 and/or the commander 20 may be assigned.

Figure 8A:
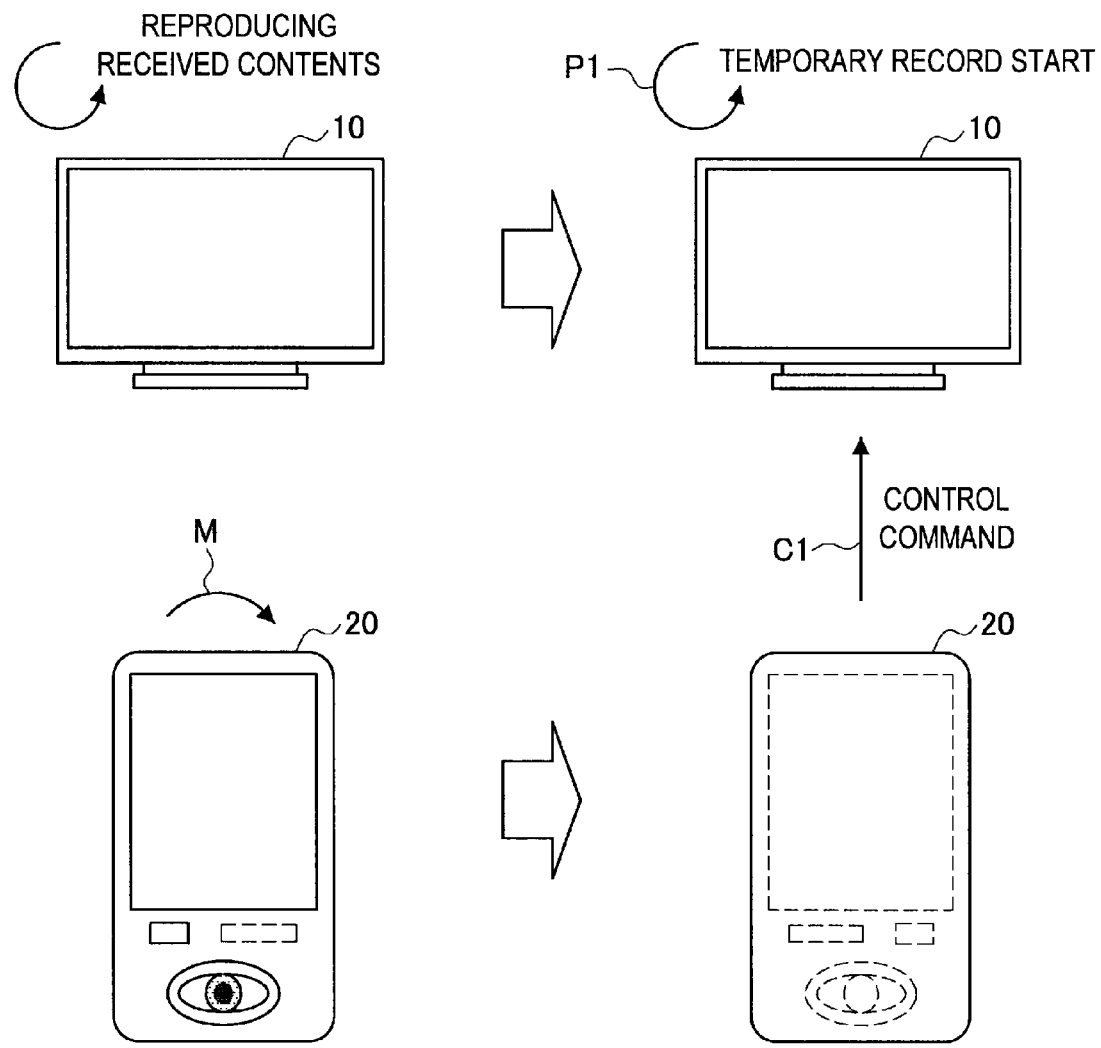
FIG. 8A is a diagram illustrating an operation example of a control system (1/4)

In the example illustrated in FIG. 8A, a control command C1 is assigned to the first operation M for starting a temporary record. When the movement determining unit 23 determines that the first operation M is performed, the command transmitting unit 28 transmits the control command C1 to the television 10. When the command receiving unit 16 receives the control command C1, the control unit 18 determines whether or not the received contents is being reproduced. In a case where the condition for an affirmative result is satisfied, the control unit 18 instructs the content recording unit 12 starts the temporary record. The content recording unit 12 starts temporarily recording the received contents supplied from the content receiving unit 11 in accordance with the instruction (P1).

The temporary record is continuously performed, for example, until a predetermined state of the commander 20 is canceled. In addition, the temporary record may be continuously performed until a predetermined time elapses or the received contents are changed as time passes by. Therefore, a user can watch the received contents, which have been reproduced in the television 10 during the execution of the first operation M, as the recorded contents which are temporarily recorded.

In the example illustrated in FIG. 8B, the control command C2 for designating a reproduction start position is assigned to the first operation M. When the command receiving unit 16 receives a command, the control unit 18 determines whether or not the recorded contents are being reproduced. In a case where the condition for an affirmative result is satisfied, the control unit 18 designates the reproduction start position (P2). The control unit 18 acquires information of the reproduction start position, which indicates a reproduction position at a time point when the instruction is received, from the content reproducing unit 13. Further, the control unit 18 stores the information in association with the ID of the recorded contents in reproduction.

At the time of reproducing the recorded contents, the control unit 18 determines whether or not the reproduction start position of the recorded contents is stored. In a case where the reproduction start position is stored, the control unit 18 makes reference to the reproduction start position and instructs the content reproducing unit 13 to reproduce the contents from the reproduction start position. The reproduction start position is stored with a designated date together, and when a predetermined period elapses from the designated date, the contents may become invalid. Therefore, a user can watch the reproduction contents, which have been reproduced in television 10 during the execution of the first operation M, from the reproduction start position.

Figure 8C:
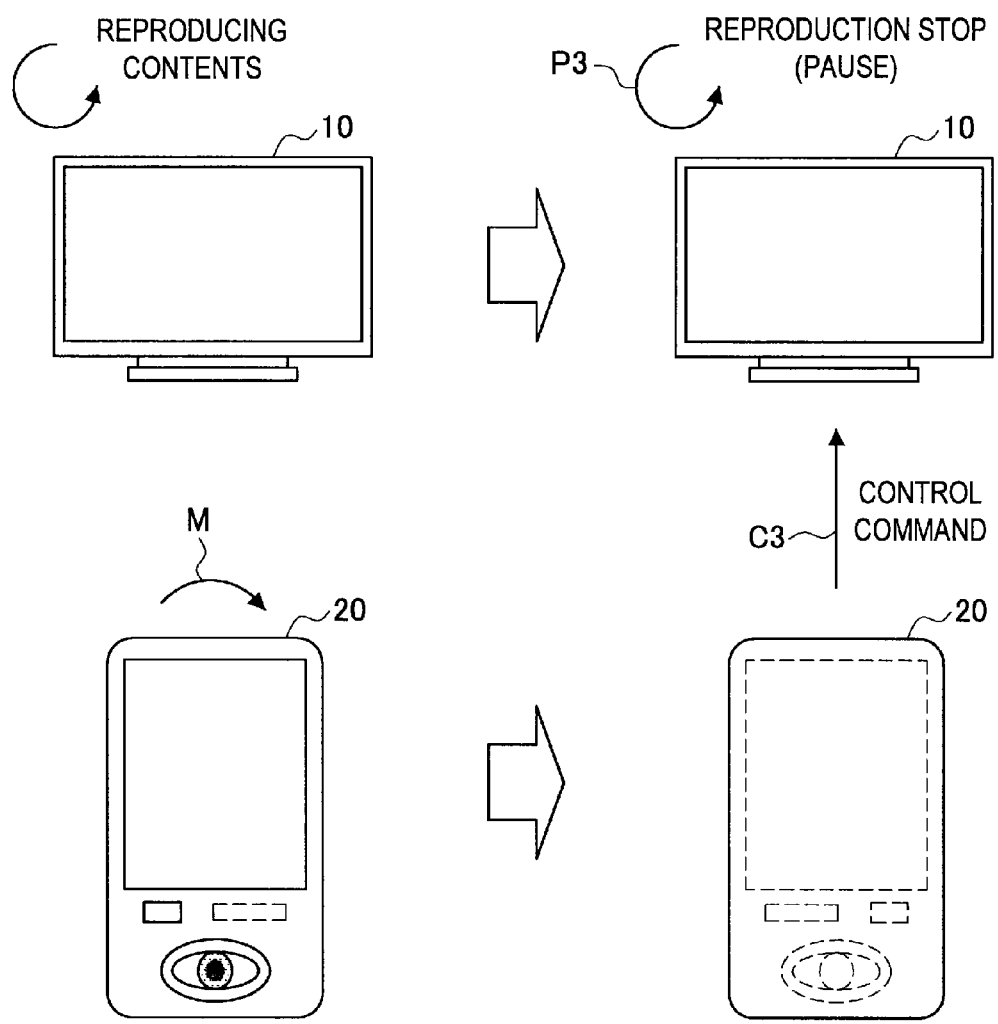
FIG. 8C is a diagram illustrating an operation example of a control system (3/4)

In the example illustrated in FIG. 8C, the control command C3 for stopping (or pausing) the reproduction of the contents is assigned to the first operation M. When the command receiving unit 16 receives the control command C, the control unit 18 determines whether or not the contents (the received contents or the recorded contents) are being reproduced. In a case where the condition for an affirmative result is satisfied, the control unit 18 instructs the content reproducing unit 13 to stop (or pause) the reproduction. The content reproducing unit 13 stops (or pauses) the reproduction process of the contents in accordance with the instruction (P3). Therefore, a user can stop (or pause) the reproduction of the contents in the television 10 by performing the first operation M.

Figure 8D:
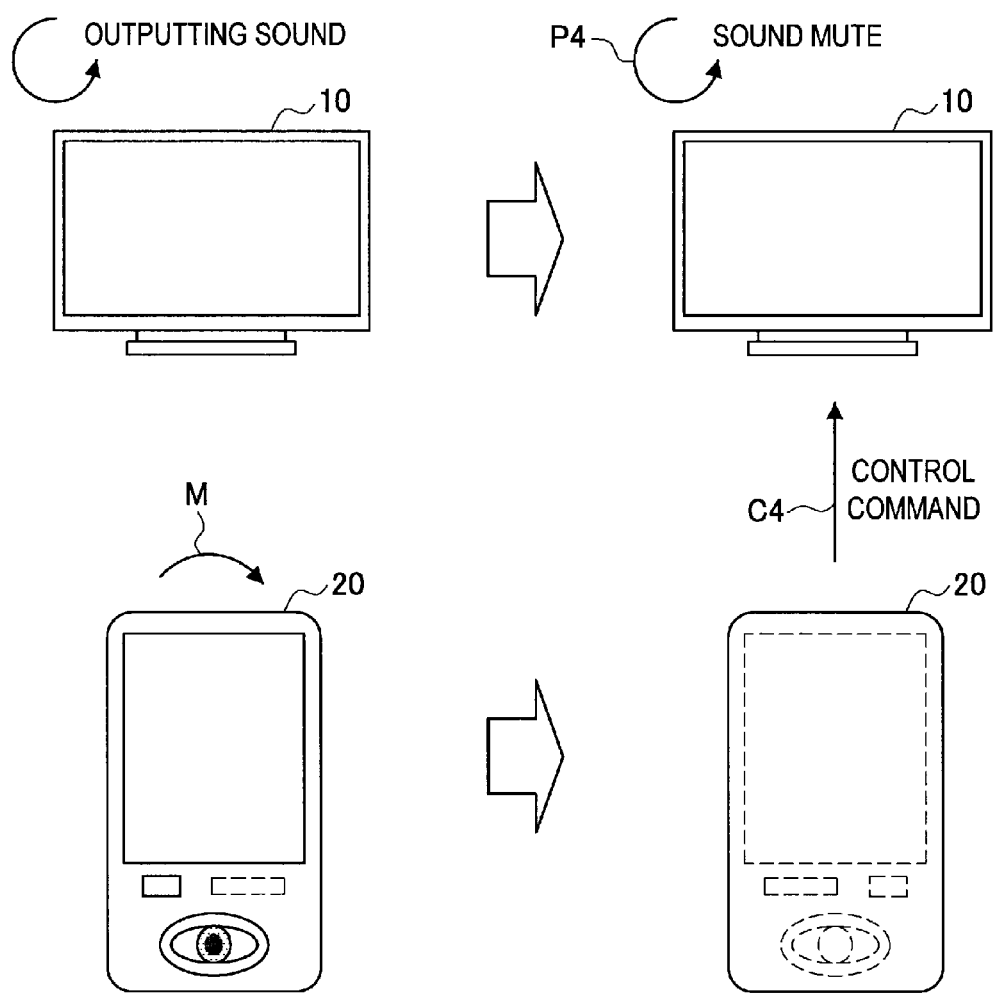
FIG. 8D is a diagram illustrating an operation example of a control system (4/4).

In the example illustrated in FIG. 8D, the control command C4 for muting the sound of the content is assigned to the first operation M. When the command receiving unit 16 receives the control command C, the control unit 18 determines whether or not the contents (the received contents or the recorded contents) are being reproduced. In a case where the condition for an affirmative result is satisfied, the control unit 18 instructs the content reproducing unit 13 to mute the sound. The content reproducing unit 13 stops outputting of the audio data to the speaker 15 or outputs silent audio data corresponding to the sound mute in accordance with the instruction (P4). Therefore, a user can mute the sound of the contents reproduced in the television 10 by performing the first operation M.

4. Conclusion

As described above, according to the embodiments of the present disclosure, the execution of the first operation M is determined by switching the commander 20 to a state in which the operation surface 20a is put face down and is placed still and the amount of the light with which the operation surface 20a is irradiated is smaller than the first threshold value. When the operation surface 20a is not put face down, it is not determined that the first operation M can be performed. Therefore, it is possible to appropriately determine whether to execute an operation in which the commander 20 enters a state where the operation surface 20a is put face down and is placed still with respect to the stationary surface S.

It should be understood by those skilled in the art that various modifications, combinations, sub-combinations and alterations may occur depending on design requirements and other factors insofar as they are within the scope of the appended claims or the equivalents thereof.

It should be noted that the present disclosure can also take the following configurations.

[1]. A control device comprising:
a first sensor that detects an acceleration acting on the control device;
a second sensor that detects light with which an operation surface of the control device is irradiated;
a movement determining unit that determines that a first operation is performed, the first operation being an operation in which the control device enters a state where the operation surface is put face down and is placed still and the operation surface is irradiated with the light with an amount smaller than a first threshold value, on the basis of detection results of the first sensor and the second sensor; and
a command transmitting unit that transmits a predetermined control command to a controlled device when it is determined that the first operation is performed.

[2]. The control device according to [1], further comprising:
a control unit that performs a process according to an operational input,
wherein the movement determining unit determines that a second operation is performed, the second operation being an operation in which the control device enters a state where the operation surface is put face down and is placed still and the operation surface is irradiated with the light with an amount equal to or larger than the first threshold value and smaller than a second threshold value which is larger than the first threshold value, and
the control unit does not perform a process according to the operational input when it is determined that the second operation is performed.

[3]. The control device according to [1],
wherein the command transmitting unit transmits a control command for temporarily recording contents which are being reproduced in the controlled device, or a control command for designating a reproduction start position of the contents to the controlled device when it is determined that the first operation is performed.

[4]. The control device according to [1],
wherein the command transmitting unit transmits, to the controlled device, a control command for pausing or stopping the contents which are being reproduced in the controlled device when it is determined that the first operation is performed.

[5]. The control device according to [1],
wherein the command transmitting unit transmits, to the controlled device, a control command for muting a sound of the contents which are being reproduced in the controlled device when it is determined that the first operation is performed.

[6]. A control method comprising:
determining that a first operation is performed, the first operation being an operation in which a control device enters a state where an operation surface is put face down and is placed still so that the operation surface is irradiated with light of an amount smaller than a first threshold value and in which the state is maintained for a predetermined time, based on an acceleration acting on the control device and a detection result of light with which the operation surface of the control device is irradiated; and
transmitting a predetermined control command to a controlled device when it is determined that the first operation is performed.

[7]. A program causing a computer to execute a control method, the control method comprising:
determining that a first operation is performed, the first operation being an operation in which a control device enters a state where an operation surface is put face down and is placed still so that the operation surface is irradiated with light of an amount smaller than a first threshold value and in which the state is maintained for a predetermined time, based on an acceleration acting on the control device and a detection result of light with which an operation surface of the control device is irradiated; and transmitting a predetermined control command to the controlled device when it is determined that the first operation is performed.

What is claimed is:

1. A control device comprising:
   a control unit to control transmission of a predetermined control command to a controlled device, responsive to a condition where an operation surface of the control device is put face down and placed still is detected from a detection result of at least two sensors,
   wherein the condition is determined as satisfied on a basis of:
   detection by a movement sensor of the at least two sensors, and whether an amount of light detected by an optical sensor of the at least two sensors is less than a predetermined first threshold value, such that the predetermined control command is transmitted responsive to the control device being detected to be face down, placed still and the optical sensor is receiving less than the predetermined first threshold value, and,
   wherein the control unit further controls transmission of another control command upon accepting an operator input on an input mechanism of the control device, such that when the control device is detected to be face down, placed still and the optical sensor detected light not less than the predetermined first threshold value, the control unit determines whether the amount of light detected by the optical sensor is less than a predetermined second threshold value greater than the predetermined first threshold value to determine that said another control command in response to said operator input is invalid.

2. The control device of claim 1, wherein the optical sensor is at a predetermined position of the operation surface.

3. The control device of claim 2, wherein the predetermined position is at a center of the operation surface.

4. The control device of claim 2, wherein the predetermined position is at a corner of the operation surface.

5. The control device of claim 1, wherein the operation surface is put face down is detected when the amount of light detected is less than the predetermined first threshold value.

6. The control device of claim 5, wherein the operation surface is put face down is detected when the amount of light detected is less than the predetermined first threshold value for a predetermined time.

7. The control device of claim 1, wherein, when the amount of light detected is less than the predetermined second threshold value and not less than the predetermined first threshold value, the control unit controls the transmission of the predetermined control command so transmission of the predetermined control command is not executed.

8. The control device of claim 1,
   wherein:
   at least one of the at least two sensors and a transmitting unit transmit the predetermined control command.

9. The control device of claim 1, wherein the movement sensor is an acceleration sensor.

10. The control device of claim 9, wherein the acceleration sensor detects acceleration acting on the control device.

11. The control device of claim 1, wherein the operation surface includes a display.

12. The control device of claim 1, wherein the controlled device is a television and the control device is a mobile device.

13. The control device of claim 1, wherein the predetermined control command includes at least one of a start of temporary recording command, a designation of a reproduction start position of recorded contents command, a reproduction stop of contents command or a sound mute of contents command.

14. A control method comprising:
   controlling, by a processor, transmission of a predetermined control command to a controlled device, responsive to a condition where an operation surface of the control device is put face down and placed still is detected from a detection result of at least two sensors,
   wherein the condition is determined as satisfied on a basis of:
   detection by a movement sensor of the at least two sensors, and whether an amount of light detected by an optical sensor of the at least two sensors is less than a predetermined first threshold value, such that the predetermined control command is transmitted responsive to the control device being detected to be face down, placed still and the optical sensor is receiving less than the predetermined first threshold value, and,
   wherein the control unit further controls transmission of another control command upon accepting an operator input on an input mechanism of the control device, such that when the control device is detected to be face down, placed still and the optical sensor detected light not less than the predetermined first threshold value, the control unit determines whether the amount of light detected by the optical sensor is less than a predetermined second threshold value greater than the predetermined first threshold value to determine that said another control command in response to said operator input is invalid.

15. A non-transitory recording medium recorded with a computer readable program executable by a computer, the program comprising:
   transmission of a predetermined control command to a controlled device, when a condition where an operation surface of the control device is put face down and placed still is detected from a detection result of at least two sensors,
   wherein the condition where the operation surface is put face down and placed still is determined as satisfied on a basis of:
   detection by a movement sensor of the at least two sensors, and whether an amount of light detected by an optical sensor of the at least two sensors is less than a predetermined first threshold value, such that the predetermined control command is transmitted when the control device is detected to be face down, placed still and the optical sensor is receiving less than the predetermined first threshold value, and,
   wherein the control unit further control transmission of another control command upon accepting an operator input on an input mechanism of the control device, such that when the control device is detected to be face down, placed still and the optical sensor is not receiving less than the predetermined first threshold value, the control unit determines whether the amount of light detected by the optical sensor of the at least one sensor is less than a predetermined second threshold value greater than the predetermined first threshold value to determine that said another control command in response to said operator input is invalid.

* * * * *